United States Patent [19]
Swanson et al.

[11] Patent Number: 6,039,177
[45] Date of Patent: Mar. 21, 2000

[54] ADJUSTABLE POCKET THERMOMETER SHEATH ASSEMBLY

[75] Inventors: Gary K. Swanson, Oakville; Ernest R. L'Heureux, Jr., Meriden, both of Conn.

[73] Assignee: Cooper Instrument Corporation, Middlefield, Conn.

[21] Appl. No.: 09/350,501

[22] Filed: Jul. 9, 1999

[51] Int. Cl.[7] .......................... B65D 85/38; G01K 15/00; G01K 1/08
[52] U.S. Cl. .............................. 206/306; 374/208; 374/1; 374/207; 206/363
[58] Field of Search ...................... 374/158, 208, 374/209, 207, 1; 206/306, 363, 446

[56] References Cited

U.S. PATENT DOCUMENTS

| | | | |
|---|---|---|---|
| 1,172,117 | 2/1916 | Dickinson | 206/306 |
| 1,501,801 | 10/1924 | Nurnberg | 206/306 |
| 1,919,811 | 7/1933 | Stonebraker . | |
| 1,947,175 | 2/1934 | Schneider . | |
| 2,037,201 | 4/1936 | Rowntree . | |
| 2,586,448 | 11/1952 | Weber et al. | 206/306 |
| 3,151,739 | 10/1964 | Guffy | 206/306 |
| 3,283,894 | 11/1966 | Hafner et al. . | |
| 4,572,366 | 2/1986 | Carson . | |
| 4,595,301 | 6/1986 | Taylor . | |
| 4,950,085 | 8/1990 | Horvath . | |
| 5,678,923 | 10/1997 | Germanow et al. . | |
| 5,775,488 | 7/1998 | Vaught | 206/306 |

FOREIGN PATENT DOCUMENTS 639770 of 1979 U.S.S.R. .

*Primary Examiner*—Diego Gutierrez
*Assistant Examiner*—Jeanne-Marguerite Goodwin
*Attorney, Agent, or Firm*—Alix, Yale & Ristas, LLP

[57] ABSTRACT

An adjustable pocket thermometer sheath assembly includes a sheath having a longitudinally extending body member defining a central bore. A pocket clip has a sleeve portion slidably mounted on the sheath and a body member having an opening. The pocket clip is slidably moveable on the sheath from an adjustment position, where the sleeve portion is disposed proximate the lower end of the sheath and the body member extends longitudinally outward from the lower end, to a storage position, where the sleeve portion is disposed proximate the upper end of the sheath and the body member is disposed adjacent the exterior surface of the sheath. The adjustment member of the thermometer may be inserted into the opening when the pocket clip is in the adjustment position such that the inner surface of the opening engages the flats of the adjustment member to prevent rotation therebetween.

18 Claims, 3 Drawing Sheets

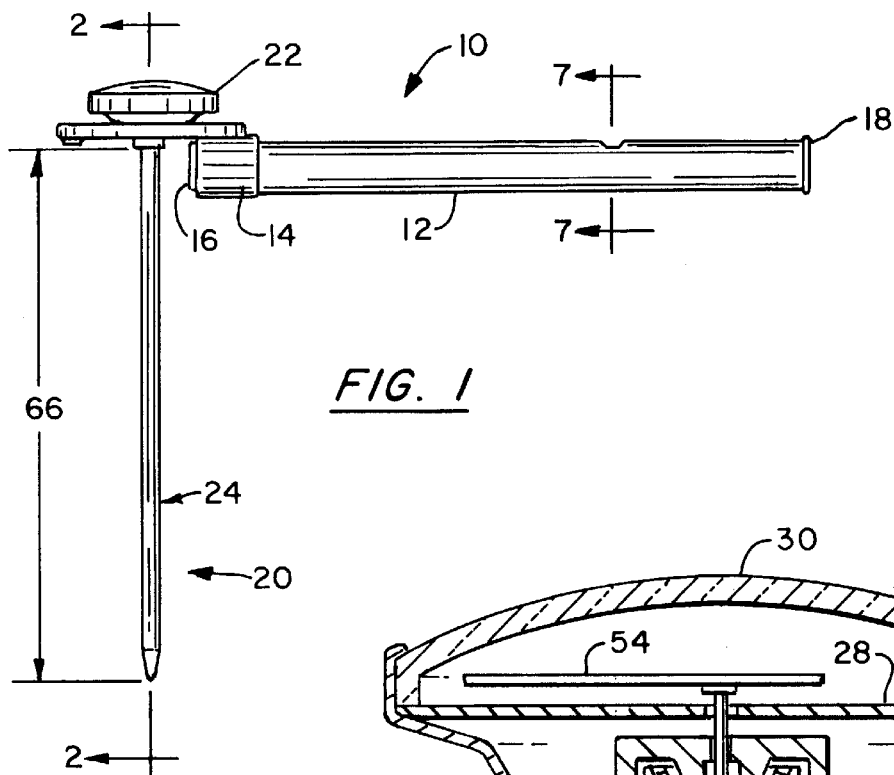
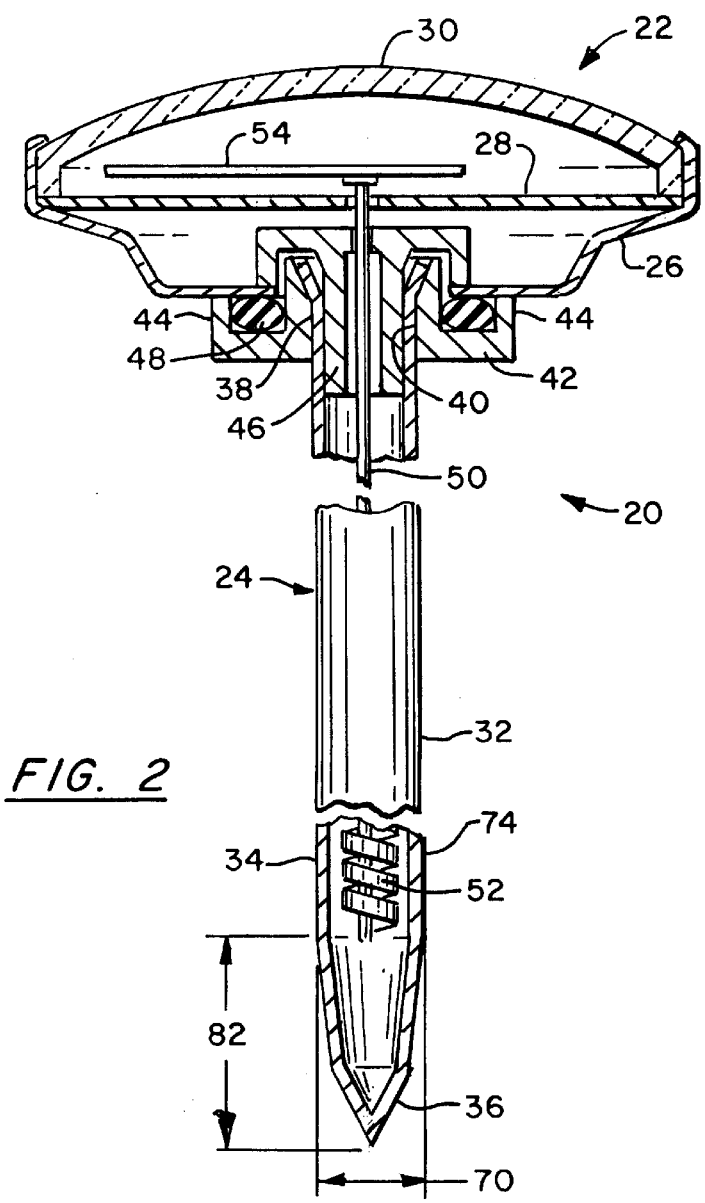
FIG. 1
FIG. 2

ADJUSTABLE POCKET THERMOMETER SHEATH ASSEMBLY

BACKGROUND OF THE INVENTION

This invention relates generally to temperature sensing instruments. More particularly, the present invention relates to a pocket holder and adjustment device for probe-type thermometers.

One popular form of probe-type thermometer consists of a metal tube containing a bimetallic spring adapted for placement in any environment in which temperature sensing is desired. A transverse dial case mounted at one end of the tube contains a scale for relatively remote indication of the temperature being sensed. A pointer indicator in connection with the bimetallic spring provides the indication of temperature sensed by movement relative to the scale.

For ease of calibration of this type of thermometer a slip-joint is included in the assembly. The relative positions of the indicator and the scale can be changed by relative rotation between the probe component and the dial case. Spring-biased frictional engagement secures the thermometer assembly in its adjusted position. Because the slip-joint is relatively tight to prevent the entrance of contaminants and the size of the dial case is relatively small for portability and convenience, it is difficult for the technician to affect calibration of the instrument in the field without having access to suitable tools for the purpose of adjustment.

SUMMARY OF THE INVENTION

Briefly stated, the invention in a preferred form is an adjustable pocket thermometer sheath assembly which includes a sheath having a longitudinally extending body member defining a central bore. A pocket clip has a sleeve portion slidably mounted on the sheath and a body member having an opening.

The pocket clip is slidably moveable on the sheath from an adjustment position, where the sleeve portion is disposed proximate the lower end of the sheath and the body member extends longitudinally outward from the lower end, to a storage position, where the sleeve portion is disposed proximate the upper end of the sheath and the body member is disposed adjacent the exterior surface of the sheath. The adjustment member of the thermometer may be inserted into the opening when the pocket clip is in the adjustment position such that the inner surface of the opening engages the flats of the adjustment member to prevent rotation therebetween.

In a preferred embodiment, the bore includes a tip receiving portion disposed adjacent the lower end of the sheath and a shaft receiving portion extending from the tip receiving portion to the upper end of the sheath. The lengths of the shaft receiving portion and the tip receiving portion are at least as long as the length of the shaft and tip portions of the probe, respectively to ensure that the probe is fully encased by the sheath. The inside diameter of the shaft receiving portion is slightly larger than the outside diameter of the shaft portion of the probe so that the interior surface of the shaft receiving portion is slidably and frictionally engageable with the shaft portion of the probe. The inside diameter of the tip receiving portion is smaller than the inside diameter of the shaft receiving portion and the outside diameter of the shaft portion of the probe. A pair of oppositely disposed projections may project radially inward from the interior surface of the tip receiving portion to grip the tip portion of the probe.

The exterior surface of the sheath has a notch disposed intermediate the upper and lower ends. A tab on the body member of the pocket clip extends radially into the notch when the pocket clip is in the storage position to grip the fabric of the user's shirt pocket. A notch in the central opening of the sleeve portion receives a longitudinally extending rib on the exterior surface of the sheath to prevent relative rotation between the pocket clip and the sheath.

It is an object of the invention to provide a new and improved sheath assembly for an adjustable pocket thermometer.

It is also an object of the invention to provide a sheath assembly which may be used to either protect the probe of a thermometer or to adjust the indication of the thermometer.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 1 is side view of a probe-type thermometer and a sheath assembly in accordance with the present invention illustrating the adjustment member of the thermometer mounted within socket of the pocket clip;

FIG. 2 is an enlarged cross sectional view of the thermometer of FIG. 1 taken along line 2—2;

DETAILED DESCRIPTION OF THE PREFERRED EMBODIMENT

Figure 4:
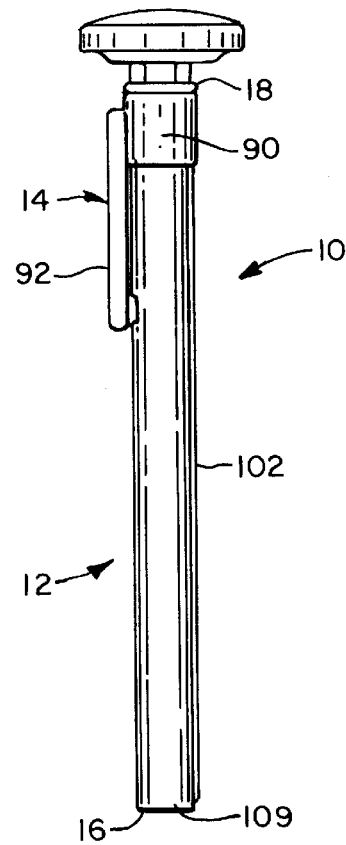
FIG. 4 is a side view of the thermometer and sheath assembly of FIG. 1 illustrating the probe of the thermometer mounted within the sheath.
Figure 6:
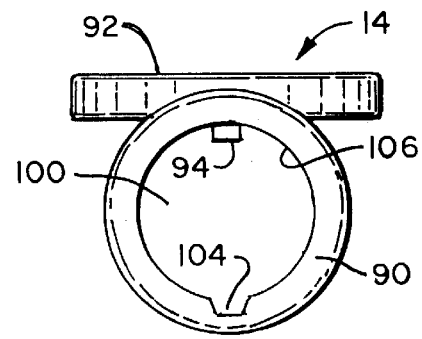
FIG. 6 is an enlarged top view of the pocket clip of FIG. 1.

With reference to the drawings wherein like numerals represent like parts throughout the several figures, a sheath assembly in accordance with the present invention is generally designated by the numeral 10. The sheath assembly 10 consists of a sheath 12 and a pocket clip 14 which is slidably moveable from an adjustment position at a lower end 16 of the sheath 12, as illustrated in FIG. 1, to a storage position at the upper end 18 of the sheath 12, as illustrated in FIG. 4.

Figure 3:
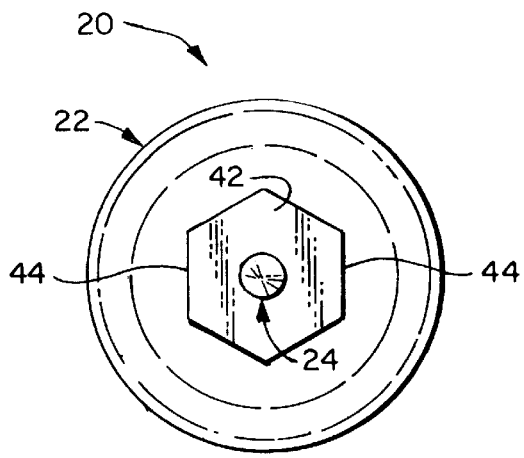
FIG. 3 is an end view of the thermometer of FIG. 2.

Referring to FIGS. 2 and 3, an adjustable probe-type thermometer 20 generally includes a dial assembly 22 and probe 24 which are slidably joined to one another to provide a mechanism for adjustment or calibration of the thermometer 20. The dial assembly 22 includes a unitary annular outer case wall 26, an annular dial plate 28, and a transparent circular cover 30. The outer portion of the dial plate 28 and the outer portion of the cover 30 are secured to one another, as well as to the outer portion of the case wall 26. The dial plate 28 preferably includes indicia arranged in a circular configuration on its upper surface which can be viewed through the cover 30.

The probe 24 includes an extended probe jacket 32 having a shaft portion 34 and a closed and pointed lower end or tip portion 36. The jacket 32 includes an upper end 38 which is fixedly attached within a central opening 40 in an adjustment member 42. The adjustment member 42 is preferably a hexagonal solid member, having peripheral paired flats 44. Probe 24 further includes a bushing 46 which performs the functions of interconnecting the dial assembly 22 and the probe 24. In one embodiment, a resilient 0-ring 48 may be positioned in an annular recess in the adjustment member 42 to engage the case wall 26, providing a relatively tight friction engagement between the dial assembly 22 and the probe 24 which allows relative rotational movement therebetween when oppositely directed torques are exerted thereupon.

The probe 24 further includes a central stem 50 rotatably mounted in jacket 32. The central stem 50 is surrounded by a bimetallic spring 52 which serves to change the rotational position of the upper end of the stem 50 in response to a change in temperature of the probe. The upper end of the stem extends through bushing 46 and a central opening in dial plate 28 and is rotatably movable therein. A transversely extending pointer indicator 54 is affixed to upper end. The indicator 54 overlies the dial plate 28 and the indicia thereon to provide an indication of the temperature to which probe 24 is exposed. It should be appreciated that relative rotation between dial assembly 22 and probe 24 will provide a change in the relative positions of indicator 54 and dial plate 28 and thus achieve an adjustment of the temperature indicated for a given temperature condition to which the probe 24 is exposed.

Figure 5:
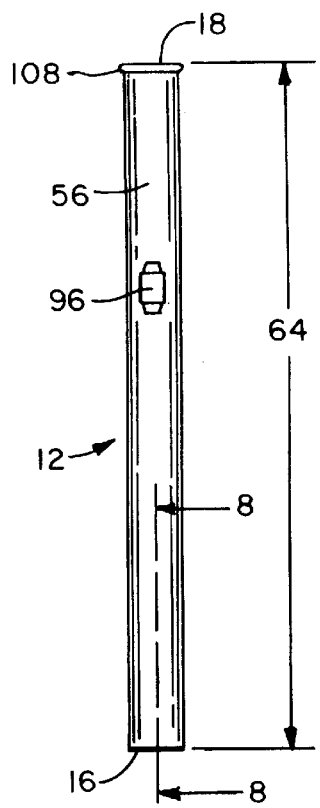
FIG. 5 is a front view of the sheath of FIG. 1.
Figure 7:
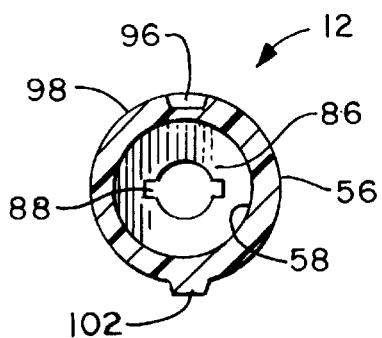
FIG. 7 is an enlarged cross sectional view of the sheath of FIG. 1 taken along line 7—7.
Figure 8:
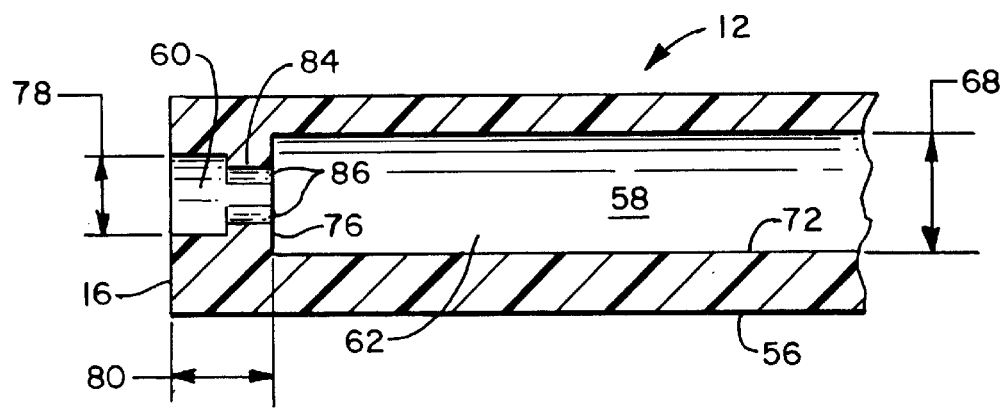
FIG. 8 is an enlarged cross sectional view of the lower portion of the sheath of FIG. 5 taken along line 8—8.
Figure 9:
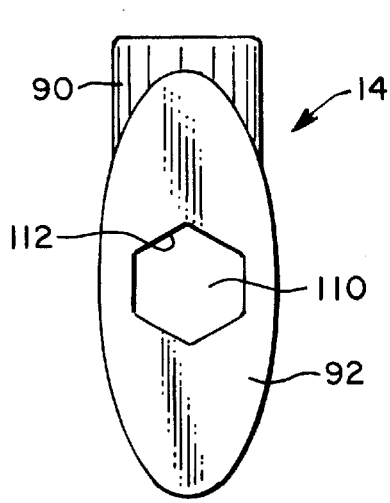
FIG. 9 is a front view of the pocket clip of FIG. 6.
Figure 10:
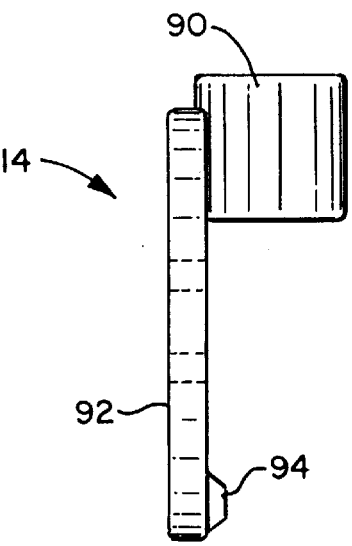
FIG. 10 is a side view of the pocket clip of FIG. 6.

With reference to FIGS. 5, 7 and 8, the sheath 12 comprises a longitudinally extending body member 56 preferably formed as an integral molded structure composed of rigid thermoplastic material. The body member 56 has upper and lower ends 18, 16 and a central bore 58 extending throughout the length thereof. The central bore 58 includes a lower, tip receiving portion 60 and an upper, shaft receiving portion 62. The distance 64 between the upper and lower ends 18, 16 is selected such that the full length 66 of the thermometer probe 24 may be received within the central bore 58, with the tip portion 36 of the probe 24 being received within tip receiving portion 60 and the shaft portion 34 of the probe 24 being received within shaft receiving portion 62.

The shaft receiving portion 62 of the central bore 58 has an inside diameter 68 which is selected such that diameter 68 is slightly greater than the outside diameter 70 of the shaft portion 34 thermometer probe 24. Consequently, the inside surface 72 of the central bore 58 slides substantially frictionlessly along the outside surface 74 of the probe 24 to receive the probe 24 of the thermometer 20 in the central bore 58. The tip receiving portion 60 of the central bore 58 includes an inwardly extending flange 76 defining an inside diameter 78 which is smaller than the inside diameter 68 of the shaft receiving portion 62. Preferably, the upper end of the flange and the lower end of the sheath define a distance 80 which is at least as great as the length 82 of the probe tip portion 36 to prevent the distal end of the probe tip from protruding from the lower end 16 of the sheath 12. The tip receiving portion 60 includes a gripping device 84 in the central bore adjacent the upper end of the flange. The gripping device 84 consists of two radially inwardly projecting projections 86 which are separated by two notches 88. The gripping device 84 tends to engage the tip portion 36 of the probe 24 to hold the thermometer probe within the central bore 58.

Referring to FIGS. 4, 6, 9 and 10, the pocket clip 14 includes an integral sleeve 90 and body member 92. Preferably, the pocket clip 14 is a unitary structure molded from polymeric material. The body member 92 of pocket clip 14 is adapted for resiliently clamping a shirt pocket or the like of a user between the body member 92 and the sheath 12, allowing the sheath assembly 10 to be supported in a conveniently available location. The free end of the body member includes a tab 94 which is received in a notch 96 on the exterior surface 98 of the sheath 12 when the pocket clip 14 is in the storage position. The tab 94 and notch 96 cooperate to grip the fabric of the pocket therebetween and thereby prevent the thermometer 20 and sheath assembly 10 from falling out of the user's pocket.

The sleeve 90 has a central opening 100 for slidably receiving the sheath 12. In a preferred embodiment, the body member 56 of the sheath 12 has a cylindrical shape and central opening 100 has a complementary circular shape. A longitudinally extending rib 102 on the exterior surface 98 of the sheath 12 is received within a notch 104 in the inside surface 106 of the sleeve 90 to prevent relative rotation between the pocket clip 14 and the sheath 12. It should be appreciated that the cross-section of the sheath 12 and central opening 100 may have complementary non-circular shapes, for example square, hexagonal, etc. If the exterior surface 98 of the sheath 12 and central opening 100 have non-circular shapes, the rib 102 may be omitted. Preferably, rib 102 is positioned oppositely to notch 96 and notch 104 is positioned oppositely to the body member 92 to ensure that tab 94 does not engage rib 102. Rib 102 is aligned with notch 104 and the lower end 16 of the sheath 12 is inserted through central opening 100 to mount the pocket clip 14 on the sheath 12. Whenever the pocket clip 14 is not in the storage position, where the tab 94 is disposed within notch 96, or the adjustment position, where the tab 94 is disposed beyond the lower end 16 of the sheath 12, tab 94 frictionally engages the exterior surface 98 of the sheath 12 to resist longitudinal movement of the pocket clip 14 on the sheath 12. A radially outward extending lip 108 at the upper end 18 of the sheath prevents the sleeve 90 from slipping off of the upper end 18 of the sheath 12. The distal end 16 of the sheath 12 also has a raised portion 109 to prevent the sleeve 90 from being removed unintentionally from the sheath 12.

The body member 92 has an opening 110 forming a socket which serves as a device for adjustment and/or calibration of the thermometer 20 described above. The walls 112 of the opening 110 are spaced to form the socket which is suitably sized for sliding receipt of adjustment member 42 of thermometer 20. To engage the adjustment member 42 in the socket the thermometer probe 24 is inserted through the opening 110. The walls 112 of the opening 110 serves as a wrench for engaging the flats 44 of adjustment member 42. It will be appreciated that adjustment of the temperature indicated by the thermometer 20 can be achieved by manually gripping dial assembly 22 in one hand and sheath 12 in the other and affecting relative rotational movement until the desired relationship between the position of indicator 54 and the indicia on dial plate 28 is obtained. This is preferably done with the probe 24 exposed to a substance having a known temperature such as boiling water or ice water. As a result the indicator 54 may be set at the proper temperature and the thermometer 20 thereby calibrated.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A sheath assembly for an adjustable pocket thermometer having a dial, a probe which is rotatively moveable relative to the dial, and an adjustment member, the adjustment member having a non-circular cross-sectional shape, the probe having a shaft portion and a tip portion disposed oppositely the dial, the sheath assembly comprising:

a sheath having a longitudinally extending body member defining a central bore and having an exterior surface and oppositely disposed upper and lower ends; and a pocket clip having a sleeve portion and a body member, the body member defining an opening having a shape which is complementary to the cross-sectional shape of the adjustment member, the sleeve portion defining a central opening receiving the sheath and being slidably moveable thereon from an adjustment position, wherein the sleeve portion is disposed proximate the lower end and the body member extends longitudinally outward from the lower end, to a storage position, wherein sleeve portion is disposed proximate the upper end and the body member is disposed adjacent the exterior surface of the sheath.

2. The sheath assembly of claim 1 wherein the exterior surface of the sheath defines a cross-sectional shape of the sheath and the central opening has a shape which is complementary to the cross-sectional shape of the sheath.

3. The sheath assembly of claim 1 wherein the pocket clip is a molded, integral, unitary structure.

4. The sheath assembly of claim 1 wherein the bore includes a tip receiving portion disposed adjacent the lower end of the sheath and a shaft receiving portion extending from the tip receiving portion to the upper end of the sheath.

5. The sheath assembly of claim 4 wherein the shaft receiving portion and the tip receiving portion each have an inside diameter, the inside diameter of the shaft receiving portion being greater than the inside diameter of the tip receiving portion.

6. The sheath assembly of claim 4 wherein the tip receiving portion includes a griping device engageable with the tip portion of the probe.

7. The sheath assembly of claim 4 wherein the tip receiving portion has an interior surface which is frictionally engageable with the shaft portion of the probe.

8. The sheath assembly of claim 1 wherein opening of the body member of the pocket clip includes at least one flat, the flat being engageable with the adjustment member of the thermometer to prevent rotation therebetween.

9. The sheath assembly of claim 1 wherein the exterior surface of the sheath defines a notch disposed intermediate the upper and lower ends and the body member of the pocket clip includes a radially extending tab, the tab being disposed within the notch when the pocket clip is in the storage position.

10. The sheath assembly of claim 9 wherein the tab resiliently engages the exterior surface of the sheath as the pocket clip is moved between the storage and adjustment positions.

11. The sheath assembly of claim 1 wherein the sheath further has a rib extending longitudinally on the exterior surface and the central opening of the sleeve portion of the pocket clip has a notch, the rib being slidably disposed within the notch.

12. A sheath assembly for an adjustable pocket thermometer having a dial, a probe, and an adjustment member, the sheath assembly comprising:

a sheath having a longitudinally extending body member defining a central bore; and a pocket clip having a sleeve portion slidably mounted on the sheath and a body member defining an opening having an inner surface engageable with the adjustment member of the thermometer to prevent rotation therebetween.

13. The sheath assembly of claim 12 wherein the sheath has an exterior surface and oppositely disposed upper and lower ends and the pocket clip is slidably moveable on the sheath from an adjustment position, wherein the sleeve portion is disposed proximate the lower end and the body member extends longitudinally outward from the lower end, to a storage position, wherein sleeve portion is disposed proximate the upper end and the body member is disposed adjacent the exterior surface of the sheath.

14. A sheath assembly for an adjustable pocket thermometer having a dial, a probe, and an adjustment member, the adjustment member having a non-circular cross-sectional shape, the probe having a tapered tip portion and a shaft portion, the tip and shaft portions each having a longitudinal length, the shaft portion having an outside diameter, the sheath assembly comprising:

a sheath having a body member extending longitudinally from a first end to a second end and defining a central bore; and a pocket clip having a sleeve portion slidably disposed on the body member of the sheath and a body member defining an opening having an inner surface engageable with the adjustment member of the thermometer to prevent rotation therebetween, the pocket clip being moveable from an adjustment position to a storage position, the sleeve portion being disposed proximate the first end and the body member extending longitudinally outward from the first end when the pocket clip is in the adjustment position and the sleeve portion being disposed proximate the second end when the pocket clip is in the storage position.

15. The sheath assembly of claim 14 wherein the bore includes a tip receiving portion disposed adjacent the first end of the sheath and a shaft receiving portion extending from the tip receiving portion to the second end of the sheath.

16. The sheath assembly of claim 15 wherein the shaft and tip receiving portions each have a length, the length of the shaft receiving portion being at least as long as the length of the shaft portion of the probe, the length of the tip receiving portion being at least as long as the tip portion of the probe.

17. The sheath assembly of claim 15 wherein the shaft receiving portion and the tip receiving portion each have an interior surface defining an inside diameter, the inside diameter of the tip receiving portion being smaller than the inside diameter of the shaft receiving portion and the outside diameter of the shaft portion of the probe, the inside diameter of the tip receiving portion being greater than the outside diameter of the shaft portion of the probe, wherein the interior surface of the tip receiving portion is slidably, frictionally engageable with the shaft portion of the probe.

18. The sheath assembly of claim 17 wherein the tip receiving portion includes griping means for griping the tip portion of the probe, the griping means comprising a pair of oppositely disposed projections projecting radially inward from the interior surface of the tip receiving portion.

* * * * *